US011609935B2

(12) United States Patent
Masis et al.

(10) Patent No.: US 11,609,935 B2
(45) Date of Patent: Mar. 21, 2023

(54) MANAGING CONFIGURATION DATASETS FROM MULTIPLE, DISTINCT COMPUTING SYSTEMS

(71) Applicant: Red Hat, Inc., Raleigh, NC (US)

(72) Inventors: Alexander Braverman Masis, Haifa (IL); Aviel Yosef, Tapuach (IL)

(73) Assignee: RED HAT, INC., Raleigh, NC (US)

( * ) Notice: Subject to any disclaimer, the term of this patent is extended or adjusted under 35 U.S.C. 154(b) by 106 days.

(21) Appl. No.: 16/930,755

(22) Filed: Jul. 16, 2020

(65) Prior Publication Data

US 2022/0019602 A1 Jan. 20, 2022

(51) Int. Cl.
*G06F 16/248* (2019.01)
*G06N 20/00* (2019.01)
(Continued)

(52) U.S. Cl.
CPC ........ *G06F 16/284* (2019.01); *G06F 9/44505* (2013.01); *G06F 16/248* (2019.01);
(Continued)

(58) Field of Classification Search
CPC ................. G06F 16/284; G06F 16/248; G06F 16/9024; G06F 9/44505; G06K 9/6256; G06N 20/00
(Continued)

(56) References Cited

U.S. PATENT DOCUMENTS 6,334,178 B1 * 12/2001 Cannon ............... G06F 9/44505
707/999.201
7,822,785 B2 10/2010 Ayachitula et al.
8,195,706 B2 6/2012 Maheshwari et al.
(Continued)

FOREIGN PATENT DOCUMENTS

CN 104123369 B 6/2017

OTHER PUBLICATIONS

Anchuri, P., et al., "Graph Mining for Discovering Infrastructure Patterns in Configuration Management Databases," Knol Inf Syst, 2012, 33:491-522 http://citeseerx.ist.psu.edu/viewdoc/download?doi=10.1.1.261.1348&rep=rep1&type=pdf.

*Primary Examiner* — James Trujillo
*Assistant Examiner* — Antonio J Caiado
(74) *Attorney, Agent, or Firm* — Kilptrick Townsend & Stockton LLP

(57) ABSTRACT

Configuration datasets from multiple, distinct computing systems can be managed. For example, a computing device can receive multiple configuration datasets describing multiple system configurations for at least two distinct computing systems. The computing device can determine key-value pairs based on the configuration datasets. The computing device store relationships between the key-value pairs in a database. The computing device can then receive a configuration dataset from a computing system of a user that can describe a system configuration for the computing system. The computing device can determine a set of key-value pairs based on the configuration dataset. The computing device can analyze the set of key-value pairs based on the relationships stored in the database to determine configuration feedback for the system configuration. The configuration manager can transmit the configuration feedback to the computing system to allow the user to implement the configuration feedback.

18 Claims, 5 Drawing Sheets

(51) Int. Cl.
  *G06F 16/28* (2019.01)
  *G06F 9/445* (2018.01)
  *G06K 9/62* (2022.01)
  *G06F 16/901* (2019.01)
(52) U.S. Cl.
  CPC ....... *G06F 16/9024* (2019.01); *G06K 9/6256* (2013.01); *G06N 20/00* (2019.01)
(58) Field of Classification Search
  USPC ........................................................ 707/736
  See application file for complete search history.

(56) References Cited

U.S. PATENT DOCUMENTS

| | | | |
|---|---|---|---|
| 8,380,645 B2 | 2/2013 | Kowalski | |
| 8,595,334 B2 | 11/2013 | Robertson et al. | |
| 9,477,780 B2 | 10/2016 | Cohen et al. | |
| 10,523,682 B1* | 12/2019 | Badawy | H04L 63/104 |
| 10,540,354 B2 | 1/2020 | Barkol et al. | |
| 10,999,164 B1* | 5/2021 | Sridhar | H04L 41/22 |
| 11,176,175 B1* | 11/2021 | Snyder | G06F 16/283 |
| 2004/0015791 A1* | 1/2004 | Smith | G01R 31/318385 |
| | | | 716/106 |
| 2004/0177135 A1* | 9/2004 | Monaton | G06F 8/61 |
| | | | 709/221 |
| 2005/0065993 A1* | 3/2005 | Honda | H04L 9/40 |
| | | | 709/200 |
| 2009/0043993 A1* | 2/2009 | Ford | G06F 11/364 |
| | | | 712/216 |
| 2013/0191436 A1* | 7/2013 | Chintalapati | G06F 9/5072 |
| | | | 709/224 |
| 2014/0281472 A1* | 9/2014 | Yalamanchili | G06F 15/7867 |
| | | | 713/100 |
| 2014/0310302 A1* | 10/2014 | Wu | G06F 16/2453 |
| | | | 707/769 |
| 2015/0052522 A1* | 2/2015 | Chanda | H04L 61/5014 |
| | | | 718/1 |
| 2015/0169417 A1* | 6/2015 | Brandwine | G06F 9/45533 |
| | | | 714/4.11 |
| 2016/0103667 A1* | 4/2016 | Chen | G06F 8/71 |
| | | | 717/121 |
| 2018/0152858 A1* | 5/2018 | Chen | H04B 7/0658 |
| 2020/0127794 A1* | 4/2020 | Lin | H04L 5/0055 |
| 2020/0301945 A1* | 9/2020 | Rehal | G06F 16/213 |
| 2021/0263751 A1* | 8/2021 | Wiest | G06F 9/44505 |
| 2021/0357470 A1* | 11/2021 | James | G06F 40/205 |
| 2022/0083350 A1* | 3/2022 | Bregman | G06F 9/44505 |

* cited by examiner

MANAGING CONFIGURATION DATASETS FROM MULTIPLE, DISTINCT COMPUTING SYSTEMS

TECHNICAL FIELD

The present disclosure relates generally to managing configuration datasets. More specifically, but not by way of limitation, this disclosure relates to managing configuration datasets from multiple, distinct computing systems.

BACKGROUND

Computing systems have system configurations defined by configuration files. The configuration files can specify software applications, server processes, operating system parameters, or other configurable parameters for the computing systems. Generally, different computing systems have different system configurations defined by their respective configuration files.

DETAILED DESCRIPTION

Figure 1:
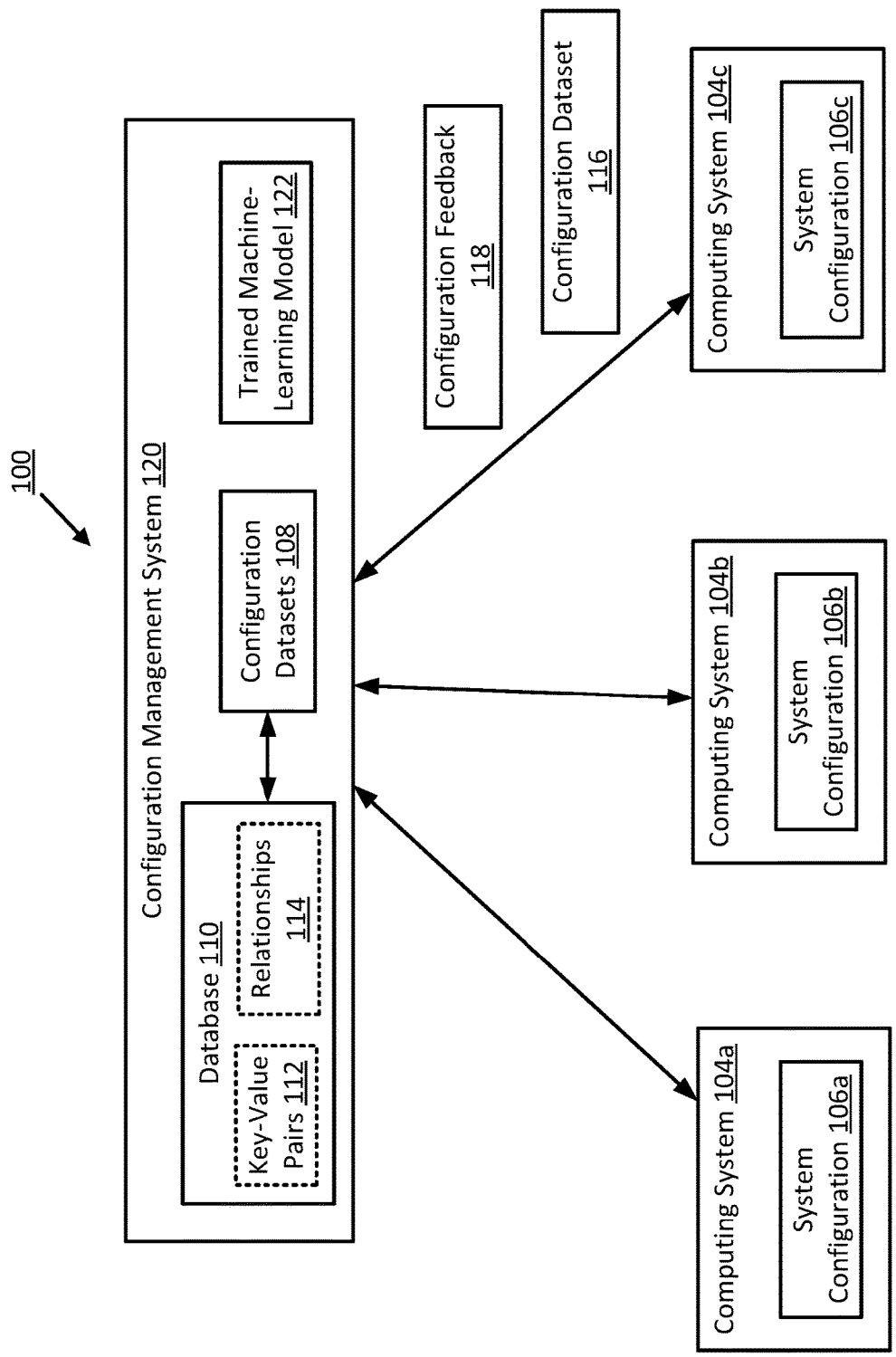
FIG. 1 is a block diagram of an example of a system for managing configuration datasets from distinct computing-systems according to some aspects of the present disclosure.

A configuration file can include a configuration dataset defining a system configuration for a computing system. Configuration datasets can specify configurations for operating systems, networking components, software applications, hardware components, or a combination of these. Configuration datasets generally depend on the characteristics of the environment in which they are deployed, such as the underlying hardware components or operating system. This can make it difficult for a user to reuse a configuration dataset to configure multiple different computing-systems, even if there are only minor differences between the computing systems. There are also other challenges with configuration datasets. For example, configuration datasets may depend on one another, which a user may not realize. As a result, a user may try to deploy a configuration dataset without one of its dependencies on a computing system, resulting in system errors. It is also difficult to track, monitor, and update configuration datasets. Often a user has to learn of a configuration change, such as software update, and manually apply the change to custom configuration files. This error prone and tedious process can have significant negative consequences, especially in situations where multiple computing-systems share common configuration-settings that must remain in synch with each other.

Some examples of the present disclosure overcome one or more of the abovementioned problems by managing configuration datasets from multiple, distinct computing-systems to allow users of the computing systems to receive feedback about the configuration datasets for their computing systems. In one example, configuration management software can receive multiple configuration-datasets describing multiple system-configurations for multiple computing-systems. The configuration management software can determine key-value pairs based on the configuration datasets. In some examples, the configuration management software can determine such key-value pairs by providing portions of the configuration datasets to parsing software, such as Augeas. Each key-value pair can include a key and a value. The key can correspond to a configurable parameter of a system configuration defined by a configuration dataset, and the value can be a setting for the configurable parameter in the system configuration. The configuration management software can determine relationships between the key-value pairs and store the relationships between the key-value pairs in a database, such as a graph database. The database can be then used to provide feedback to users about their computing systems.

For example, the configuration management software can then receive a configuration dataset from a computing system of a user describing a system configuration for the computing system. That computing system may or may not have been used to generate the database. The configuration management software can determine (e.g., generate) a set of key-value pairs based on the configuration dataset. The configuration management software can analyze the set of key-value pairs based on the relationships previously stored in the database to determine configuration feedback for the system configuration. The configuration management software can then transmit the configuration feedback to the computing system. The computing system may automatically update itself based on the configuration feedback or may be updated by the user based on the configuration feedback.

In some examples, the configuration management software can execute in a distributed computing environment (e.g., a cloud computing environment) or another type of computing environment that can serve as a centralized system in communication with one or more external computing systems, from which the configuration management software can receive the configuration datasets. The computing environment executing configuration management software can be referred to as a configuration management system. The configuration management system can receive configuration datasets defining any number of system configurations from any number of external computing systems. The external computing systems may belong to different entities from one another, such as different organizations or companies. The external computing systems can be set up differently to one another. For example, they may have different hardware characteristics (e.g., central processing units, memory units, and input-output devices), software characteristics (e.g., operating system configurations), or both. Based on the received configuration datasets, the configuration management system can then generate a database of configuration information. The configuration management system can then use that database to provide configuration feedback, for example using the process described above.

Although some examples described herein relate to key-value pairs, it will be appreciated that the configuration management system can determine other types of data representations based on the configuration datasets received from the external computing systems, where the data representations specify configurable parameters in a system configuration and values for those configurable parameters.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for managing configuration datasets from distinct computing-systems according to some aspects of the present disclosure. The system 100 includes a configuration management system 120 that can communicate with any number of computing systems external to itself. The computing systems can have different configurations of hardware components and software components than one another. In this example, the configuration management system 120 can communicate with computing systems 104a-c.

In some examples, the configuration management system 120 can receive any number of configuration datasets describing any number of system configurations for any number of computing systems. In one particular example, the computing systems can be Linux-based computing systems with configuration datasets derived from Linux configuration files defining the system configurations for the Linux-based computing systems.

In this example, the configuration management system 120 can receive configuration datasets 108 from computing systems 104a-b. The configuration datasets 108 can describe system configurations 106a-b for the respective computing systems 104a-b. For example, the configuration datasets 108 can describe system configurations 106a-b including software applications, server processes, and operating systems, or a combination of these.

The configuration management system 120 can determine key-value pairs 112 (or another type of data representation) based on the configuration datasets 108 from computing systems 104a-b. The keys of the key-value pairs 112 can correspond to configurable parameters of the system configurations 106a-b and the values of the key-value pairs 112 can be the settings for the configurable parameters. For example, a key may be a password and a value for the key can be a sequence of characters specifying the password.

The configuration management system 120 can determine relationships 114 between the key-value pairs 112 based on the configuration datasets 108. For example, the configuration datasets 108 can be obtained from plain text files and can include a list of the keys and the values for each of the configuration datasets 108. The configuration management system 120 can parse the list of the keys and the values of the configuration datasets 108 to determine (e.g., generate) key-value pairs 112. The configuration management system 120 may use a software application such as Augeus to parse the configuration datasets 108 into key-value pairs 112. The configuration management system 120 can then determine one or more relationships 114 among the key-value pairs 112.

In some examples, the relationships 114 can include one or more key-value pair hierarchies, which are hierarchical relationships among key-value pairs. In some such examples, the configuration management system 120 may generate a graph- or tree-like structure (e.g., with nodes and branches) specifying the hierarchical relationships among some or all of the key-value pairs 112. Each key-value pair hierarchy can indicate a respective hierarchical relationship between a respective group of key-value pairs 112 determined from a respective configuration dataset among the configuration datasets 108. The configuration management system 120 may also use Augeus or other software to determine such hierarchical relationships 114.

Having determined the relationships 114, the configuration management system 120 can then store the key-value pairs 112 and the relationships 114 in a database 110. In some examples, the database 110 can be a graph database that can store the key-value pairs 112 and the relationships 114 between the key-value pairs 112 as graph data structures. In a graph data structures, key-value pairs 112 can serve as nodes and the relationships 114 between the key-value pairs 112 can define connections, or edges, between the nodes. The graph database may cluster the key-value pairs 112 more tightly or loosely based on their relationships 114.

After the relationships 114 are stored in the database 110, the configuration management system 120 can receive an additional configuration dataset describing an additional system configuration for an additional computing system that is different from the computing systems 104a-b. The configuration management system 120 can update the relationships 114 stored in the database 110 based on the additional configuration dataset. In this way, the configuration management system 120 can dynamically update the database 110 over time as new information is received.

In some examples, the configuration management system 120 can receive a configuration dataset 116 from a different computing system than the computing systems 104a-b used to initially generate the database 110. For example, the configuration management system 120 can receive the configuration dataset 116 describing a system configuration 106c for the computing system 104c. The configuration management system 120 can determine a set of key-value pairs based on the configuration dataset 116. For example, the configuration management system 120 can parse the configuration dataset 116 as described above. The set of key-value pairs can include a set of keys corresponding to a set of configurable parameters in the system configuration 106c and a set of values assigned to the set of configurable parameters in the system configuration 106c.

After determining the set of key-value pairs, the configuration management system 120 can analyze the set of key-value pairs to provide configuration feedback 118 for the computing system 104c. For example, the configuration management system 120 can analyze the set of key-value pairs based on the relationships 114 stored in the database 110 to determine configuration feedback 118 for the computing system 104c. For example, the configuration management system 120 can apply predefined rules to the set of key-value pairs based on the relationships 114 stored in the database 110 to determine the configuration feedback 118. Additionally or alternatively, the configuration management system 120 can provide the set of key-value pairs as input to a trained machine-learning model to receive the configuration feedback 118 as output from the trained machine-learning model. Examples of the trained machine-learning model can include a neural network or a classifier. The trained machine-learning model can be trained using training data, such as the relationships 114 stored in the database 110, to identify suboptimal configuration settings (e.g., errors or conflicts) in the configuration dataset 116. The trained machine-learning model may then generate outputs based on those findings, where the outputs may themselves serve as the configuration feedback 118 or be used to generate the configuration feedback 118.

In some examples, the configuration feedback 118 can indicate that a value in the set of key-value pairs is outside a target value range. The target value range can be the range that most (e.g., 90%) of the values for a particular key fall into. The configuration management system 120 may analyze some or all of the values for the particular key stored in the database 110 to determine the target value range. Additionally or alternatively, the configuration feedback 118 can include a recommendation to adjust a value in the set of key-value pairs to a new value. The configuration management system 120 can use the information stored in the database 110 to determine the new value. For example, the configuration management system 120 can determine a mean or median value for a particular key by analyzing some or all of the values for that key in the database 110. The configuration management system 120 can use the mean or median value as the new value in the configuration feedback 118. Additionally or alternatively, the configuration feedback 118 can include a recommendation for a piece of software that is not already included in the system configuration 106c. The configuration management system 120 can determine the recommendation based on information stored in the database 110. For example, the configuration management system 120 can analyze the database 110 and determine that, in many instances, a certain piece of software is included in other system configurations similar to the system configuration 106c. The configuration management system 120 can recommend the certain piece of software in the configuration feedback 118 for the computing system 104c.

Having determined the configuration feedback 118, the configuration management system 120 can then transmit the configuration feedback 118 to the computing system 104c. The computing system 104c can receive the configuration feedback 118 and responsively perform one or more operations. In some examples, the operations can include automatically adjusting the system configuration 106c based on the configuration feedback 118. For example, the computing system 104c can automatically (i) update the value of a configurable parameter to a new value specified in the configuration feedback 118, (ii) update the value of the configurable parameter to a new value that is within a target range specified in the configuration feedback 118, or (iii) download recommended software in the configuration feedback 118. Alternatively, the computing system 104c can output the configuration feedback 118 to a user (e.g., on a display device), so that the user can take appropriate corrective action.

A user can query the database 110 in some examples to see how many users have a particular key or value for the particular key and what other key-value pairs are related to that key or value. The user can use the information from querying the database 110 to update configuration datasets for their computing system.

In some examples, the configuration management system 120 can notify the computing systems 104a-c of available updates to their system configurations 106a-c. For example, a value in a key-value pair may be updated in the database 110. The value may be updated in the database 110 due to a bug fix, due to additional information received from other computing systems, or due to other factors. Based on the update, the configuration management system 120 can inform the computing systems 104a-b that the value for the key has changed. The computing systems 104a-b can respond by automatically update their configuration datasets 108 based on the change, or the configuration datasets 108 can be manually updated based on the change. This may promote uniformity across system configurations 106a-b or assist with resolving bugs and other problems.

While the example shown in FIG. 1 depicts a specific number and arrangement of components for simplicity, other examples may include more components, fewer components, different components, or a different arrangement of the components shown in FIG. 1. For example, the database 110 can represent any number and combination of databases that can be centralized or distributed among the computing systems 104a-c. In some such examples in which the database 110 is distributed among the computing systems 104a-c, a user can access a local portion of the database 110 to compare settings for the configuration dataset 116 to settings commonly used for the configuration datasets 108 of similar system configurations.

Figure 2B:
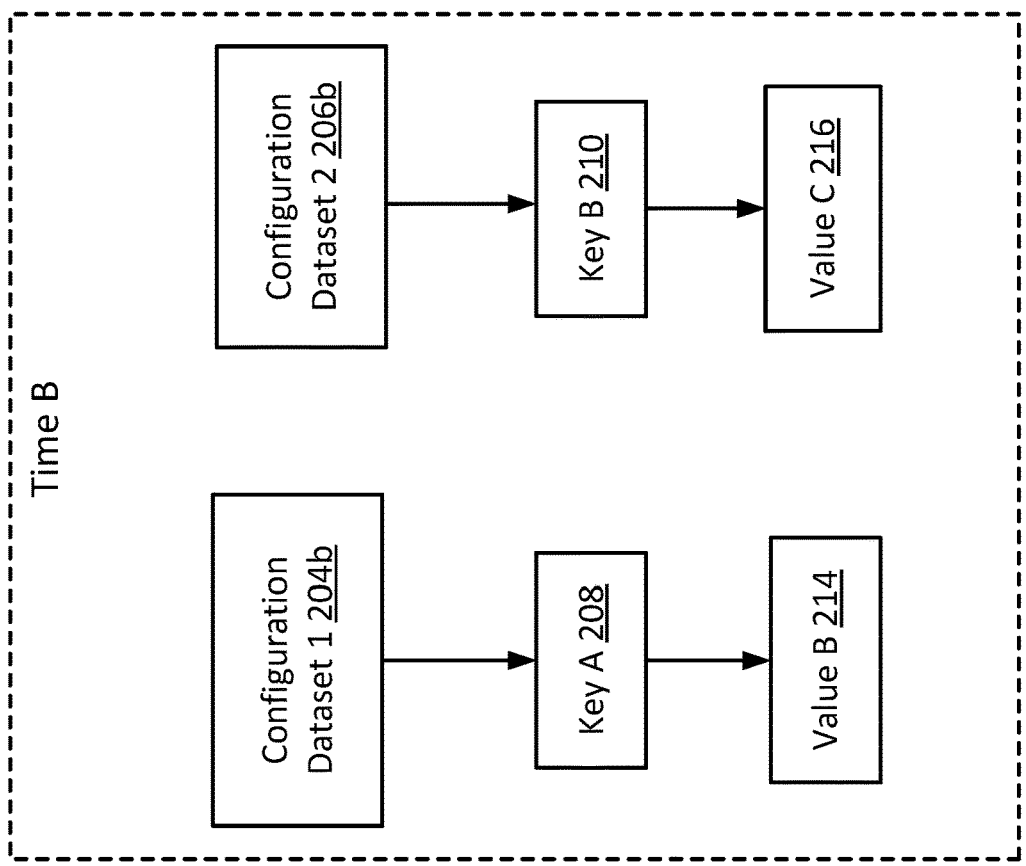
FIGS. 2A-B are diagrams of key-value pairs derived from configuration datasets according to some aspects of the present disclosure.
Figure 2A:
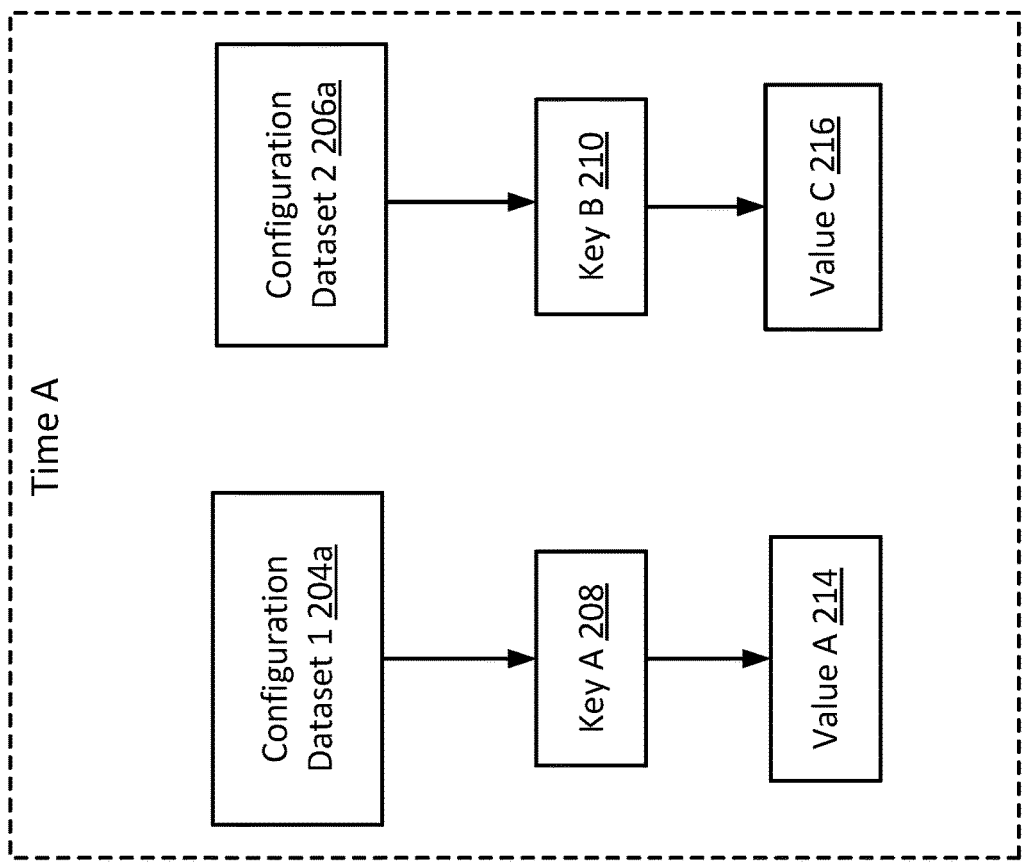

FIGS. 2A-B are diagrams of key-value pairs derived from configuration datasets according to some aspects of the present disclosure. In particular, FIG. 2A depicts key-value pairs in two configuration datasets at Time A—configuration dataset 204a and configuration dataset 206a. Configuration dataset 204a and configuration dataset 206a can describe the same or different system configurations of a computing system. Configuration dataset 204a can have Key A 208 with Value A 214. Key A 208 and Value A 214 make up a key-value pair. Key A 208 can describe a configurable parameter of the system configuration and Value A 214 can be assigned to the configurable parameter. Configuration dataset 206a can have Key B 210 with Value C 216. Key B 210 and Value C 216 can make up another key-value pair. The key-value pairs can change over time. For example, FIG. 2B depicts the key-value pairs at Time B, which can be a different point in time than Time A. These key-value pairs can be updated versions of the key-value pairs shown in FIG. 2A. In this example, configuration dataset 1 204b can have Key A 208 and Value B 218, while configuration dataset 2 206b can have Key B 210 and Value C 216.

Figure 3:
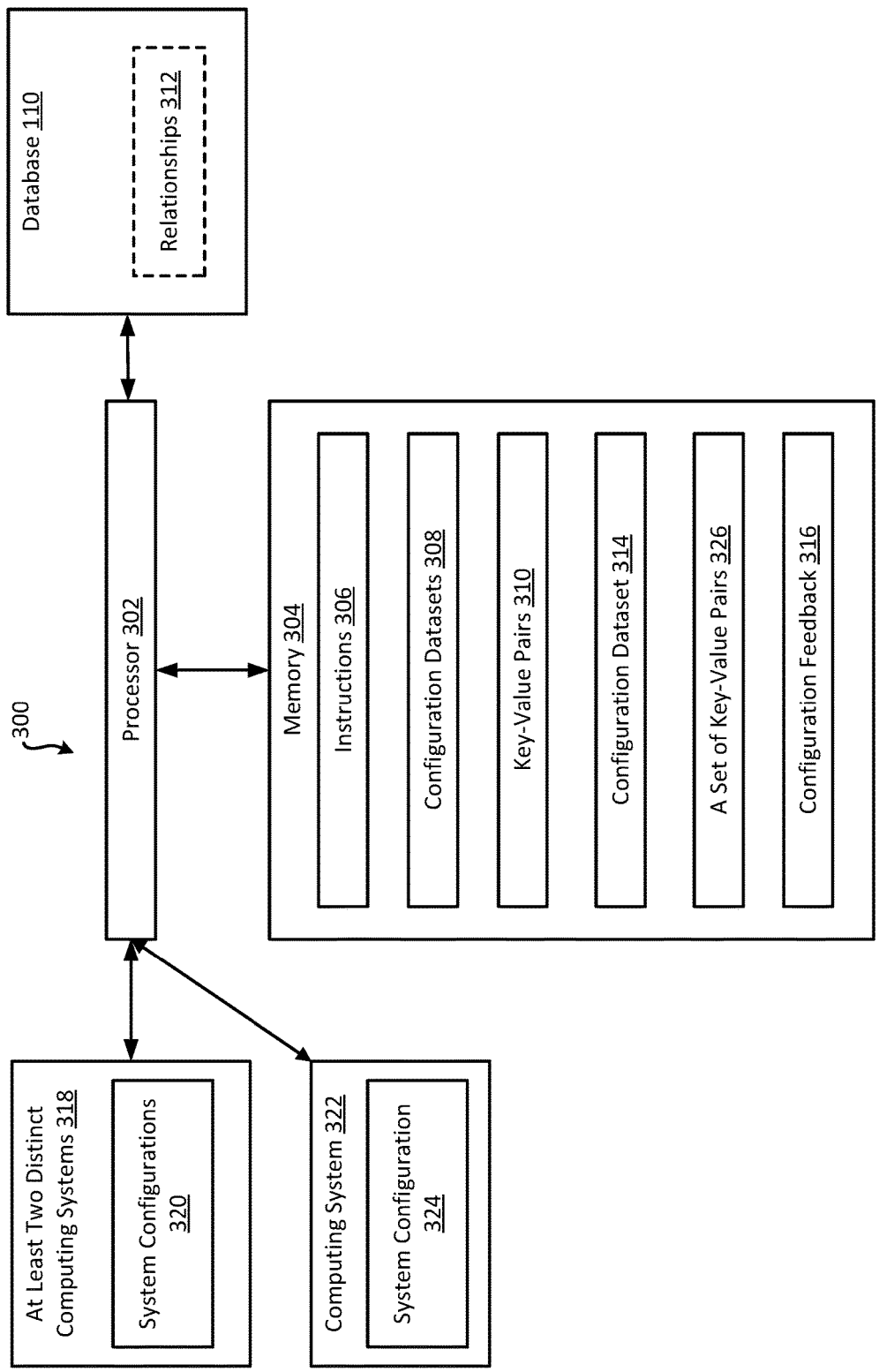
FIG. 3 is a block diagram of another example of a system for managing configuration datasets from distinct computing-systems according to some aspects of the present disclosure.

FIG. 3 is a block diagram of another example of a system 300 for managing configuration datasets from distinct computing-systems according to some aspects of the present disclosure. The system 300 includes a processor 302 communicatively coupled with a memory 304. In some examples, the processor 302 and the memory 304 can be part of a system, such as the configuration management system 120 of FIG. 1.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. In some examples, at least some of the memory can include a medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to receive configuration datasets 308 describing system configurations 320 for at least two distinct computing systems 318. In some examples, the processor 302 can receive the configuration datasets 308 by extracting them from one or more files, which may be received from the at least two distinct computing systems 318 (e.g., via a network).

Next, the processor 302 can determine key-value pairs 310 based on the configuration datasets 308. In some examples, the processor 302 may determine the key-value pairs 310 by applying parsers to the configuration datasets 308. Alternatively, the configuration datasets 308 may already be in key-value form upon their receipt from the at least two distinct computing systems 318. In some such examples, the processor 302 may determine the key-value pairs 310 by identifying the key-value pairs already set forth in the configuration dataset 308. Either way, the key-value pairs 310 can include (i) keys corresponding to configurable parameters in the system configurations 320 and (ii) values assigned to the configurable parameters in the system configurations 320.

After determining the key-value pairs, the processor 302 can determine relationships 312 between the key-value pairs 310. The processor 302 may then store the relationships 312 between the key-value pairs 310 in a database 110, such as a graph database, which may or may not be included in the memory 304.

Subsequent to storing the relationships 312 in the database 110, the processor 302 can receive a configuration dataset 314 from a computing system 322. The configuration dataset 314 can describe a system configuration 324 for the computing system 322. The processor 302 can determine a set of key-value pairs 326 based on the configuration dataset 314. The set of key-value pairs 326 can include (i) a set of keys corresponding to a set of configurable parameters in the system configuration 324 and (ii) a set of values assigned to the set of configurable parameters in the system configuration 324. The processor 302 can analyze the set of key-value pairs 326 based on the relationships 312 stored in the database 110 to determine configuration feedback 316 for the system configuration 324. In response, the processor 302 can transmit the configuration feedback 316 to the computing system 322. This may improve the system configuration 324 for the computing system 322.

Figure 4:
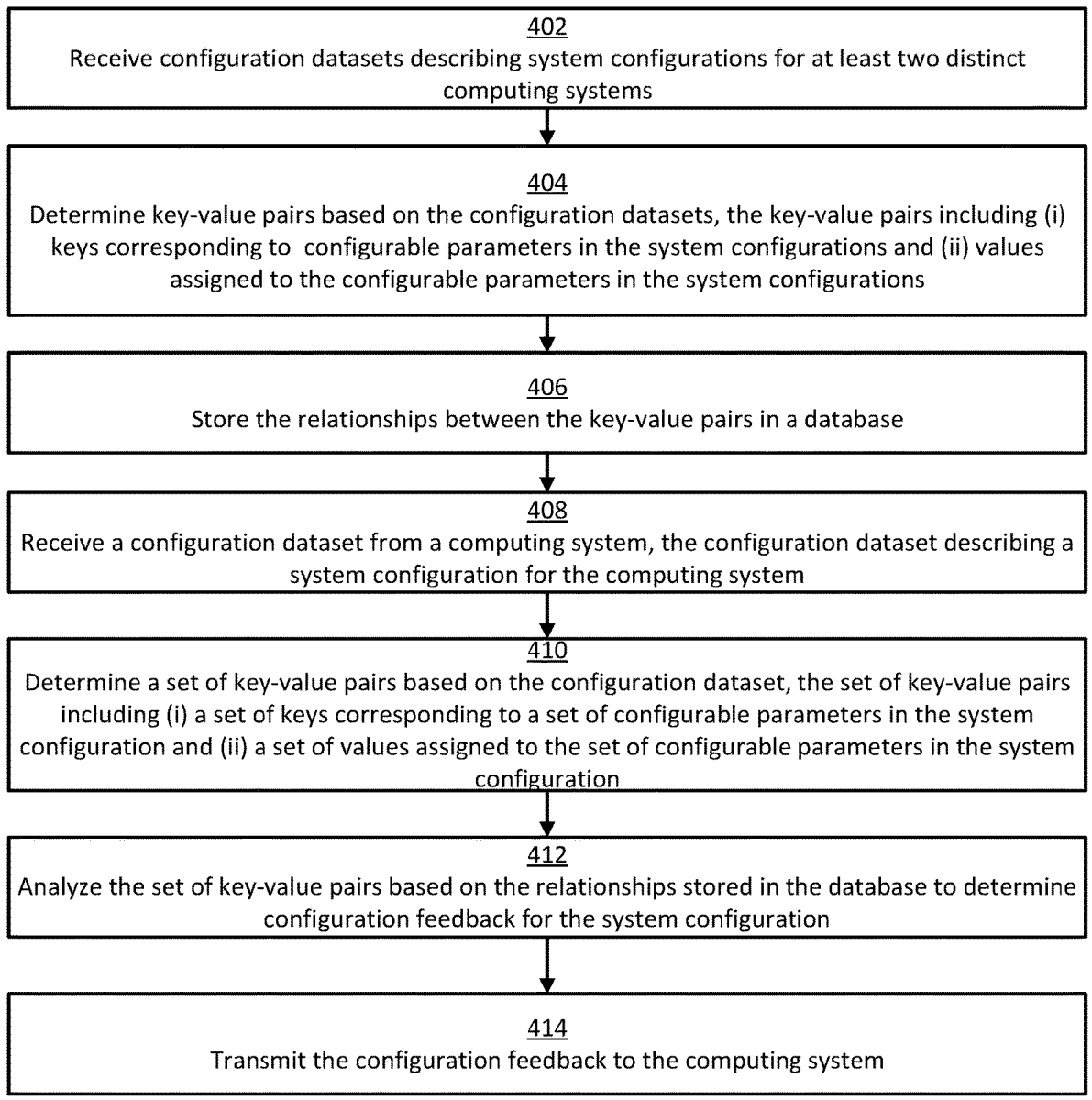
FIG. 4 is a flow chart of an example of a process for managing configuration datasets from distinct computing-systems according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 receives configuration datasets 308 describing system configurations 320 for at least two distinct computing systems 318. In some examples, the processor 302 can receive the configuration datasets 308 directly or indirectly. For example, the processor 302 can receive the configuration datasets 308 by extracting them from one or more files, which in turn may be received from the at least two distinct computing systems 318 (e.g., via a network).

In block 404, the processor 302 determines key-value pairs 310 based on the configuration datasets 308. In some examples, the processor 302 may determine the key-value pairs 310 by applying parsers to the configuration datasets 308. Alternatively, the configuration datasets 308 may already be in key-value form upon their receipt from the at least two distinct computing systems 318. In some such examples, the processor 302 may determine the key-value pairs 310 by identifying the key-value pairs already set forth in the configuration dataset 308. Either way, the key-value pairs 310 can include (i) keys corresponding to configurable parameters in the system configurations 320 and (ii) values assigned to the configurable parameters in the system configurations 320. The key-value pairs 310 can be stored in a database 110 accessible to a configuration management system 120 that may include the processor 302.

In block 406, the processor 302 stores relationships 312 between the key-value pairs 310 in the database 110. For example, the processor 302 can store the relationships 312 as graph data structures in a graph database. The processor 302 can update the relationships 312 stored in the database 110 over time in response to receiving one or more additional configuration datasets describing one or more additional system configurations for one or more additional computing systems.

In block 408, the processor 302 receives a configuration dataset 314 from a computing system 322. In some examples, the processor 302 can receive the configuration dataset 314 by extracting it from one or more files, which may be received from the computing system 322 (e.g., via a network). The configuration dataset 314 can describe a system configuration 324 for the computing system 322. The computing system 322 can be different from the at least two distinct computing systems 318 used to generate the database 110. This may result in the configuration dataset 314 being new to the processor 302 in the sense that the configuration dataset 314 was not used to generate the database 110, though there may be some overlap between the configuration datasets 308 used to generate the database 110 and the configuration dataset 314 received from the computing system 322.

In block 410, the processor 302 determines a set of key-value pairs 326 based on the configuration dataset 314. The processor 302 can determine the set of key-value pairs 326 using any of the techniques described above. For example, the processor 302 can parse the configuration dataset 314 into the set of key-value pairs 326. The set of key-value pairs 326 can include (i) a set of keys corresponding to a set of configurable parameters in the system configuration 324 and (ii) a set of values assigned to the set of configurable parameters in the system configuration 324.

In block 412, the processor 302 analyzes the set of key-value pairs 326 (e.g., a hierarchy of the key-value pairs) based on the relationships 312 stored in the database 110 to determine configuration feedback 316 for the system configuration 324. The processor 302 can determine the configuration feedback 316 by performing one or more graph queries in examples in which the database 110 is a graph database.

In block 414, the processor 302 transmits the configuration feedback 316 to the computing system 322. The computing system 322, or a user of the computing system 322, can receive the configuration feedback 316 and adjust the configuration dataset 314 to improve the system configuration 324 for the computing system 322.

Figure 5:
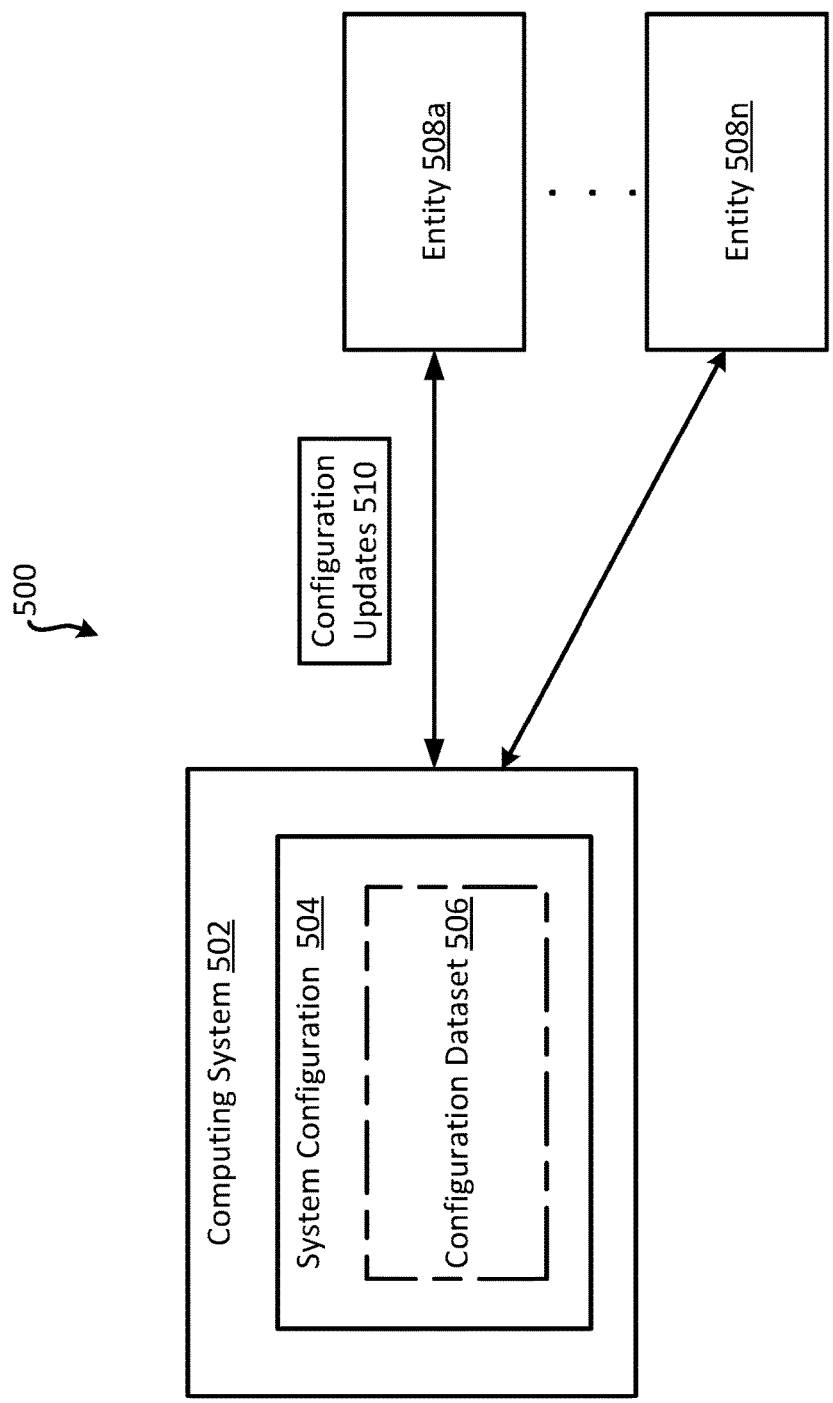
FIG. 5 is a block diagram of another example of a system for managing configuration datasets from distinct computing-systems according to some aspects of the present disclosure.

FIG. 5 is a block diagram of an example of a system 500 for managing configuration datasets from distinct computing-systems according to some aspects of the present disclosure. The computing system 502 can include configuration dataset 506 describing system configuration 504.

In some examples, a user of the computing system 502 can select one or more entities 508a-n to follow. Examples of the entities 508a-n can include users, organizations, and/or a remote computing devices. The entities 508a-n may form a community (e.g., of developers) that can share information and updates about configuration datasets, and such entities may be different from the organizations that originally developed the hardware and software of the computing system 502 that is configured via the configuration dataset 506. The user may select which of the one or more entities 508a-n to follow by providing user input indicating which entities to follow via a user input device, such as a keyboard, mouse, or touch-screen display. For example, the user can select one or more target entities to follow from a list of candidate entities output in a graphical user interface.

Based on the user selecting one or more entities 508a-n to follow, the computing system 502 can be set to follow the entities 508a-n. Setting the computing system 502 to follow an entity 508a may involve the computing system 502 storing a unique identifier, such as a username or website, associated with the entity in a datastore. The computing system 502 can then use the unique identifier to periodically retrieve configuration updates 510 from the entity 508a. Additionally or alternatively, setting the computing system 502 to follow an entity 508a may involve the computing system 502 communicating with the entity 508a for causing the entity 508a to store a unique identifier (e.g., a username or an internet protocol address) associated with the computing system 502 in a datastore. This can enable the entity 508a to periodically push configuration updates 510 to the computing system 502. Either way, once the computing system 502 is set to follow the entity 508a, the computing system 502 can automatically receive configuration updates 510 from entity 508a.

As one example, the entity 508a may publish an update to correct one or more bugs in configuration dataset 506. Based on the entity 508a publishing the update, the computing system 502 can automatically receive configuration updates 510 notifying the user of the potential update. The user of computing system 502 can choose to apply the update to the configuration dataset 506.

In some examples, a user can set the computing system 502 to follow a configuration dataset of an entity, such as entity 508a. For example, the user may set the computing system 502 to follow the entity using any of the approaches discussed above. When a followed entity 508a makes an update to its configuration dataset associated with its system configuration, computing system 502 can automatically receive configuration updates 510 indicating the update. The user of computing system 502 can then choose to apply the update to its configuration dataset 506, for example to keep the configuration dataset 506 in synch with the other configuration dataset associated with the followed entity 508a. In this way, multiple configuration datasets can be kept in synch with one another across various entities. As one example, one or more entities 508a-n can update their security settings in their respective configuration datasets. Computing system 502 can receive configuration updates 510 indicating the changes to the security settings made by the one or more entities 508a-n and the user of computing system 502 can choose to implement some or all of the changes to configuration dataset 506.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A configuration management system comprising:
a processor; and
a memory including instructions that are executable by the processor for causing the processor to:
receive configuration datasets describing system configurations for at least two distinct computing systems, the at least two distinct computing systems each including hardware and being remote from the configuration management system, wherein the at least two distinct computing systems correspond to different entities;
determine key-value pairs based on the configuration datasets, the key-value pairs including (i) keys corresponding to configurable parameters in the system configurations and (ii) values assigned to the configurable parameters in the system configurations;
store relationships between the key-value pairs in a database; and
subsequent to storing the relationships in the database:
receive a configuration dataset from a computing system, the configuration dataset describing a system configuration for the computing system, the computing system including hardware and being remote from the configuration management system;
determine a set of key-value pairs based on the configuration dataset, the set of key-value pairs including (i) a set of keys corresponding to a set of configurable parameters in the system configuration and (ii) a set of values assigned to the set of configurable parameters in the system configuration;
analyze the set of key-value pairs based on the relationships stored in the database to determine configuration feedback tailored for the system configuration, wherein the configuration feedback includes a recommendation for a piece of software that is not already included in the system configuration, the recommendation being determined based on information stored in the database; and
transmit the configuration feedback from the configuration management system to the computing system.

2. The configuration management system of claim 1, wherein the database is a graph database and the relationships are stored in the graph database as one or more graph data structures in which the key-value pairs serve as nodes and the relationships between the key-value pairs define connections between the nodes.

3. The configuration management system of claim 2, wherein the memory further comprises instructions that are executable by the processor for causing the processor to:
determine a plurality of key-value pair hierarchies based on the configuration datasets, each key-value pair hierarchy among the plurality of key-value pair hierarchies indicating a respective hierarchical relationship between a group of key-value pairs determined from one of the configuration datasets;
determine the one or more graph data structures based on the plurality of key-value pair hierarchies, the one or more graph data structures indicating the relationships between the key-value pairs; and
store the graph data structures in the database.

4. The configuration management system of claim 1, wherein the configuration feedback includes another recommendation to adjust a value in the set of values to a new value, and wherein the memory further comprises instructions that are executable by the processor for causing the processor to determine the new value based on information stored in the database.

5. The configuration management system of claim 1, wherein the configuration feedback indicates that a value in the set of values is outside a target value range, and wherein the memory further comprises instructions that are executable by the processor for causing the processor to determine the target value range based on information stored in the database.

6. The configuration management system of claim 1, wherein the memory further comprises instructions that are executable by the processor for causing the processor to, subsequent to storing the relationships in the database:
receive an additional configuration dataset describing an additional system configuration for an additional computing system that is different from the at least two distinct computing systems; and
update the relationships stored in the database based on the additional configuration dataset.

7. The configuration management system of claim 1, wherein the memory further comprises instructions that are executable by the processor for causing the processor to generate the configuration feedback by providing the set of key-value pairs as input to a trained machine-learning model.

8. The configuration management system of claim 1, wherein the at least two distinct computing systems are associated with a plurality of different organizations.

9. The configuration management system of claim 1, wherein the at least two distinct computing systems are a plurality of Linux-based computing systems, and wherein the configuration datasets are derived from a plurality of Linux configuration files defining the system configurations for the plurality of Linux-based computing systems.

10. A method comprising:
receiving, by a processor of a configuration management system, configuration datasets describing system configurations for at least two distinct computing systems, the at least two distinct computing systems each including hardware and being remote from the configuration management system, wherein the at least two distinct computing system correspond to different entities;
determining, by the processor, key-value pairs based on the configuration datasets, the key-value pairs including (i) keys corresponding to configurable parameters in the system configurations and (ii) values assigned to the configurable parameters in the system configurations;
storing, by the processor, relationships between the key-value pairs in a database; and
subsequent to storing the relationships in the database:
receiving, by the processor, a configuration dataset from a computing system, the configuration dataset describing a system configuration for the computing system, the computing system including hardware and being remote from the configuration management system;
determining, by the processor, a set of key-value pairs based on the configuration dataset, the set of key-value pairs including (i) a set of keys corresponding to a set of configurable parameters in the system configuration and (ii) a set of values assigned to the set of configurable parameters in the system configuration;
analyzing, by the processor, the set of key-value pairs based on the relationships stored in the database to determine configuration feedback tailored for the system configuration, wherein the configuration feedback includes a recommendation for a piece of software that is not already included in the system configuration, the recommendation being determined based on information stored in the database; and
transmitting, by the processor, the configuration feedback from the configuration management system to the computing system.

11. The method of claim 10, wherein the database is a graph database and the relationships are stored in the graph database as one or more graph data structures in which the key-value pairs serve as nodes and the relationships between the key-value pairs define connections between the nodes.

12. The method of claim 11, further comprising:
determining a plurality of key-value pair hierarchies based on the configuration datasets, each key-value pair hierarchy among the plurality of key-value pair hierarchies indicating a respective hierarchical relationship between a group of key-value pairs determined from one of the configuration datasets;
determining the one or more graph data structures based on the plurality of key-value pair hierarchies, the one or more graph data structures indicating the relationships between the key-value pairs; and
storing the graph data structures in the database.

13. The method of claim 10, wherein the configuration feedback includes another recommendation to adjust a value in the set of values to a new value, and wherein the new value is determined based on information stored in the database.

14. The method of claim 10, wherein the configuration feedback indicates that a value in the set of values is outside a target value range, and wherein the target value range is determined based on information stored in the database.

15. The method of claim 10, further comprising:
receiving an additional configuration dataset describing an additional system configuration for an additional computing system that is different from the at least two distinct computing systems; and
updating the relationships stored in the database based on the additional configuration dataset.

16. The method of claim 10, further comprising generating the configuration feedback by providing the set of key-value pairs as input to a trained machine-learning model.

17. The method of claim 10, wherein the at least two distinct computing systems are associated with a plurality of different organizations.

18. A non-transitory computer-readable medium comprising program code that is executable by a processor of a configuration management system for causing the processor to:

receive configuration datasets describing system configurations for at least two distinct computing systems, the at least two distinct computing systems each including hardware and being remote from the configuration management system, wherein the at least two distinct computing systems correspond to different entities, wherein the at least two distinct computing systems are a plurality of Linux-based computing systems, and wherein the configuration datasets are derived from a plurality of Linux configuration files defining the system configurations for the plurality of Linux-based computing systems;

determine key-value pairs based on the configuration datasets, the key-value pairs including (i) keys corresponding to configurable parameters in the system configurations and (ii) values assigned to the configurable parameters in the system configurations;

store relationships between the key-value pairs in a database; and subsequent to storing the relationships in the database:
 receive a configuration dataset from a computing system, the configuration dataset describing a system configuration for the computing system, the computing system including hardware and being remote from the configuration management system;
 determine a set of key-value pairs based on the configuration dataset, the set of key-value pairs including (i) a set of keys corresponding to a set of configurable parameters in the system configuration and (ii) a set of values assigned to the set of configurable parameters in the system configuration;
 analyze the set of key-value pairs based on the relationships stored in the database to determine configuration feedback tailored for the system configuration; and
 transmit the configuration feedback from the configuration management system to the computing system.

* * * * *